Figure 1:
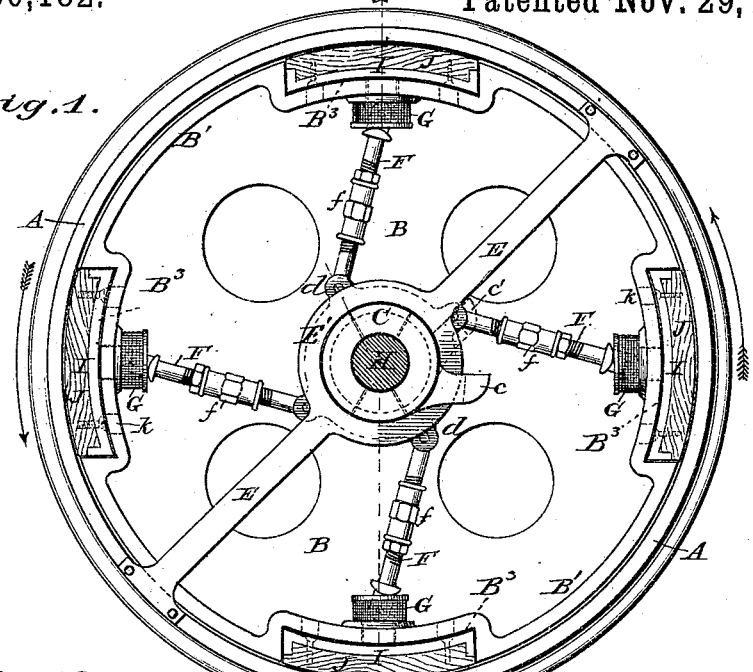

(No Model.)

H. E. ARMITAGE.
FRICTION CLUTCH FOR PULLEYS AND HOISTING ENGINES.

No. 250,182. Patented Nov. 29, 1881.

Attest:
Jno. C. Bansemer
James W. Jackson

Henry E. Armitage, Inventor.
By H. L. Perrine, Atty.

UNITED STATES PATENT OFFICE.

HENRY E. ARMITAGE, OF DENVER, COLORADO, ASSIGNOR OF ONE-HALF TO JAMES W. JACKSON, OF SAME PLACE.

FRICTION-CLUTCH FOR PULLEYS AND HOISTING-ENGINES.

SPECIFICATION forming part of Letters Patent No. 250,182, dated November 29, 1881.

Application filed October 1, 1881. (No model.)

*To all whom it may concern:*

Be it known that I, HENRY E. ARMITAGE, a citizen of the United States, residing at Denver, in the county of Arapahoe and State of Colorado, have invented certain new and useful Improvements in Friction-Clutches for Pulleys and Hoisting-Engines, of which the following is a specification, reference being had therein to the accompanying drawings.

My invention relates to friction devices for controlling motion by band-pulleys, and is especially adapted for use with the drum of a hoisting-engine for mining and other purposes, but may be applied to a loose pulley on a constantly-revolving shaft for the transmission of power therefrom, as may be required.

My improvement embraces matters of construction and of combination in a friction-pulley clutch adapted to relieve the shaft of end-thrust in the operation of applying the binding action upon the loose friction ring or band-pulley. The band-pulley or friction-ring is mounted loosely upon the shaft, and a rimmed disk keyed to the shaft within the open face of the pulley serves to carry friction-blocks, which, as they are forced out or retracted, bite against the inner side of the pulley-rim or friction-ring, or are released from their binding action thereon in starting and stopping the motion of said band-pulley or drum. The friction-blocks are connected by pivoted arms to a hub adapted only for rotary movement, mounted loosely upon the shaft, and to which hub said pivoted arms have a tangential relation, while a shifter adapted to both turn and to slide upon shaft co-operates with a diameter-bar fixed to the rim of the loose band-pulley or friction-ring to extend or retract the friction-blocks, and thus to apply and release the power of the revolving shaft, as may be required for any special operation. The effect of the conjoint action of the several operating parts will be to cause the shifter to become engaged with the diameter-bar of the loose pulley or friction-ring, and thus retard or slow the revolving motion of the hub and the inner ends of the arms pivoted thereto, while the driver will cause the outer ends of said arms to revolve with equal speed with it, and thus, by reason of the tangential relation of the pivoted arms with the non-sliding hub, they will be caused to approach radial lines, and thereby force the friction-blocks against the loose-pulley rim and bind said pulley or ring to the driver, so that they must turn together. The driver and the pulley or friction-ring then turning together with the shaft relieves the shifter from pressure other than is necessary to overcome the resistance being put upon the band-pulley or drum, or other than is sufficient to cause the friction-blocks to bite upon the pulley, and such pressure will be governed by the load to be overcome by the band, or the load on the cage of a hoisting-machine.

Figure 2:
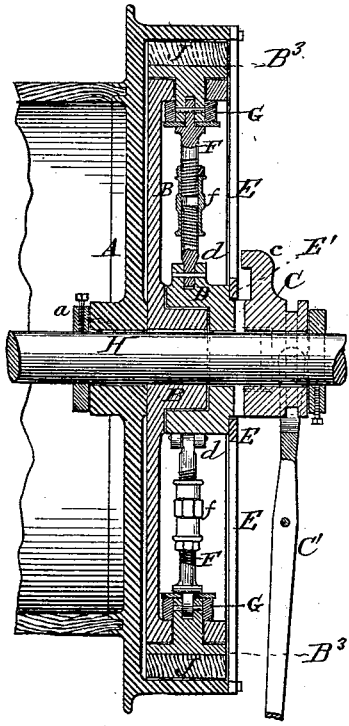
Figure 3:
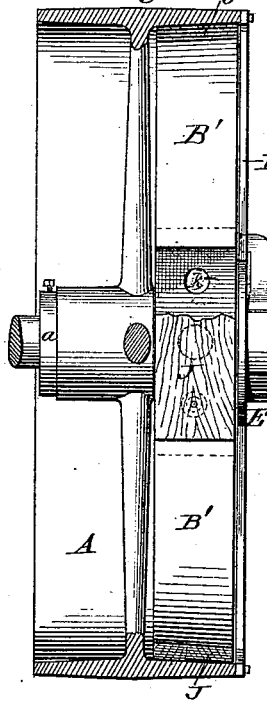
Figure 4:
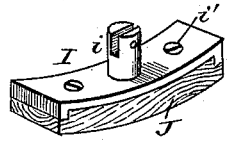
Figure 5:
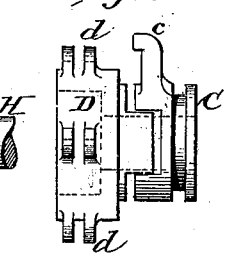
Figure 6:
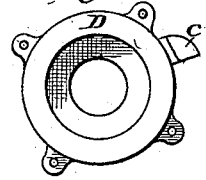

Referring to the accompanying drawings, Figure 1 represents a face view of my improved friction-clutch as applied to the drum of a hoisting-engine, the clutch-shifter being in the relation it occupies to the pulley when the drum is not being driven; Fig. 2, a section of the same on the line *x x* of Fig. 1; Fig. 3, the friction-clutch as applied to a band-pulley, showing the clutch device proper in elevation and the band-pulley in section, the shifter being shown as clutched with the diameter-bar of the loose pulley; Fig. 4, one of the friction blocks or shoes detached; Fig. 5, the loose hub and the shifter, and Fig. 6 the inner end of the loose hub.

The friction-ring of the drum or the band-pulley A is mounted loosely upon the constantly-revolving shaft H, while a rimmed disk or plate, B, keyed to said shaft, fits loosely within the rim of the ring or pulley, and has formed within its circumferential rim B' two or more (preferably four) equidistant recesses, forming seats B³, within which the friction-blocks J are snugly fitted, and form with the disk the driver for the band-pulley or drum-ring. Over and upon the keyed hub of this driver is fitted a hollow hub, D, which is loose upon the shaft. A shifter-clutch part, C, is also fitted loosely upon the shaft H, and while constantly maintaining its clutch-connection with the hub D, as shown in Fig. 5, is free to be turned with it upon and independent of the shaft for a limited distance.

The shifter-section is also adapted for a limited sliding movement upon said shaft by means of the clutch-lever C', while maintaining its clutch-connection with the hub D, for a purpose to be presently stated.

The brake or friction blocks J, seated in the driver-rim, are secured to a metallic holder or back, I, by screws i', the back of said holder being formed with a short slotted stem, i, as shown in Fig. 4. This slotted stem i projects through a central hole in the rim-seat B³ of the driver, and forms the means of making a pivotal connection of the friction-block with the arm F. The inner ends of these arms are pivoted to lugs d, formed equidistant on the circumference of the hub D, so that in the normal or inoperative condition of the clutch these arms F occupy tangential relation, or nearly so, to said hub D, as shown in Fig. 1. These arms are, in fact, each formed by a right and left screw-stem coupled by a nut, f, whereby each arm is adjusted in a manner to effect an equal and simultaneous action of all the friction-blocks when the latter are either projected or retracted.

I have stated that the shifter C has a perpetual clutch-connection with the hub D, and as both these parts are fitted loosely upon the shaft, they therefore cannot form a clutch of themselves, and are not designed for such function. In connection, however, with the shifter C and the hub D, I provide the friction-ring or pulley A with a wrought-iron bar, E, across its diameter, and secured to its rim with a central eye part, E', encircling the hub D, which is shouldered to receive said eye part, as shown in Fig. 2, and thus hold the said hub in proper relation to the driver. The primary function, however, of this diameter-bar is to form a clutch part of the loose pulley with the shifter by forming the latter with a lug or arm, c, standing inward toward said diameter-bar in such manner as to form a lock with it when the shifter is inward upon the shaft, so that the arm c will cross the diameter-bar, and thus serve to bring into action the hub and its connected operating-arms to apply the friction-blocks, as will be presently stated.

For the purpose of releasing the friction-blocks from their binding action upon the loose pulley and retracting said blocks when the clutch is not in use, the arms F are provided with rubber or coil springs G, arranged to be compressed by the action of said arms in applying the friction-blocks, and to exert a retracting force upon said arms when the clutch is disengaged. For this purpose the springs are placed upon the stem i of the friction-blocks, between a shoulder on the arms and the recessed seat part B³ of the driver-rim.

From the foregoing description it will be understood that the driver, with its friction-blocks and their connected hub D, constantly revolve with the shaft when the shifter C is thrown out, as in Fig. 2, by reason of the connection of said hub by said arms with the rim of the driver. To set the drum or pulley in motion the shifter C is thrown in, as in Fig. 3, carrying the lug or arm c in position to come against the diameter-bar of the loose pulley, which is stationary upon the shaft. This engagement of the shifter will prevent the further rapid revolving motion of the hub D with the shaft, and thus hold the inner ends of the arms F stationary for a moment or two, while the continuous motion of the driver will carry the outer ends of the arms F with it, and, causing them to approach radial lines, thereby force out the friction-blocks in binding-contact with the loose pulley. As the friction-blocks tighten against the pulley the latter is thereby clamped to the driver and revolved with it. The revolving of the pulley and diameter-bar relieves the shifter-arm c from any more pressure than is required to overcome the resistance upon the pulley. The motion of the pulley or drum is stopped by disengaging the shifter C from the diameter-bar of said pulley.

It is important to notice that the thrusting action of the friction-blocks is produced by the tangential relation of the pivoted arms F to the loose hub D, and that such thrusting action is at right angles to the axial line of the shaft, and therefore the latter is relieved of end-thrust in applying the friction-blocks.

The seat part B³ of the driver-rim is provided with holes k for the purpose of allowing the friction-blocks to be unscrewed and new ones to be secured without removing any part of the clutch.

The loose pulley and the shifter are kept in place by collars upon the shaft.

An important matter in the construction of my friction-pulley is that the hub D has only a partial revolving motion—that is, when the shifter is engaged upon the hub of the driver—and that the shifter and pulley diameter-bar serve as the means of controlling such motion of the hub D, and thereby the operation of the friction-blocks, to give a prompt and firm binding action upon the pulley.

The driver B B', the friction-blocks J, and the hub D revolve together with the shaft, because the driver is keyed to said shaft, and the hub, arms, and blocks are connected to the driver. In this motion of the parts the hub D has no independent motion upon the driver-hub; but when the shifter C c is engaged with the bar E of the pulley A, then the hub D has a partial revolving motion upon the hub of the driver for the purpose stated.

I claim—

1. The combination of the rimmed driver B, the friction-blocks J, the turning hub D, and the pivoted arms F, arranged in tangential relation to said hub, substantially as described, with the friction-rim of a drum or a pulley provided with a diameter-bar, E, and the shifter C c, the several parts being adapted for operation substantially as described.

2. In a friction-clutch, the drum or pulley A, having the diameter-bar E, formed with a central ring, E', in combination with the hub D, loose upon its shaft, the arms F, pivoted to said hub and connected with the friction-blocks and with the said driver, and the sliding shifter C c, whereby the said hub D is held in place for operating said arms, as set forth.

3. The turning hub D and the turning and sliding shifter C c, having a constant engagement with each other, in combination with the driver, its friction-blocks, the arms F, and the diameter-bar E of the drum ring or pulley, substantially as described, for the purpose specified.

4. In combination, the rimmed driver, the friction-blocks, the turning hub D, and the turning and sliding shifter, the friction ring or pulley provided with a diameter-bar, E, and the arms F, provided with springs arranged to act against the rim of said driver to retract the friction-blocks by a direct action upon said arms, substantially as described.

In testimony whereof I have affixed my signature in the presence of two witnesses.

HENRY E. ARMITAGE.

Witnesses:
 HENRY T. ROGERS,
 H. TOWNSEND.